United States Patent Office 3,231,944
Patented Feb. 1, 1966

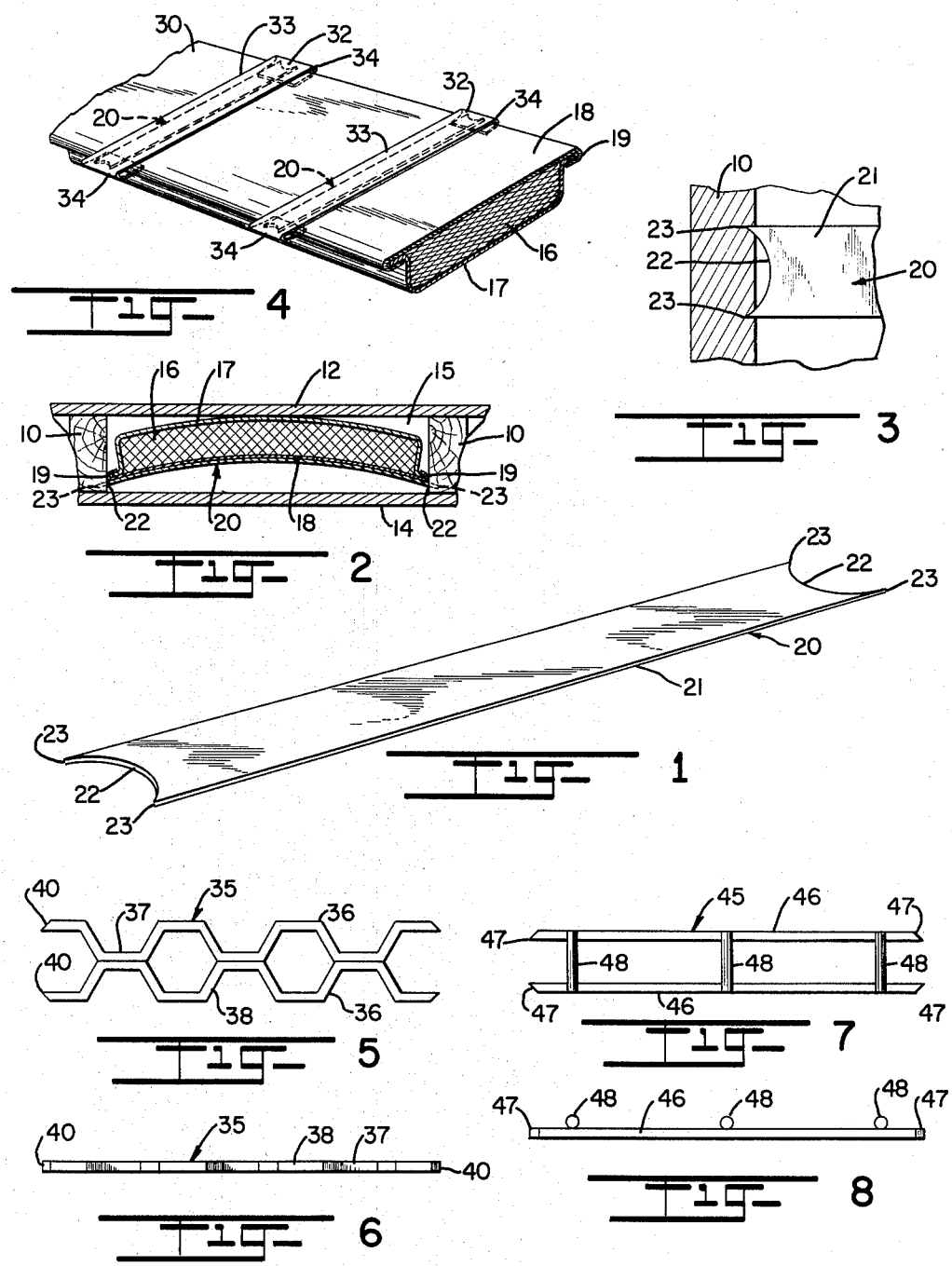

3,231,944
INSULATION SUPPORT
Dean J. Bennett, Box 182, Gordon, Nebr.
Filed May 11, 1962, Ser. No. 194,036
1 Claim. (Cl. 52—406)

This invention relates to a new and improved means of support for insulation; and, additionally relates to an insulation product incorporating a novel means of support for positioning and retaining the insulation in place.

To insulate buildings and various other structures, insulation is conventionally supplied in the form of sheets or batts for insertion between the main supporting members, such as, the joists or studding members. In this form, it is highly desirable to make provision for means to rapidly and securely position the insulation so as to prevent sagging or slipping once in place. Also, the insulation supporting element or elements should be made to be economical to manufacture, easy to install, sturdy and durable in use. It is of additional benefit to enable simultantous installation of the insulation and the supporting elements, for instance by supplying the insulation and the supporting elements as a single article of manufacture.

Accordingly, it is a principal object of the present invention to make provision for new and improved means for supporting insulation in place, particularly insulation of the type supplied in sheet or batt form, and said means possessing the necessary flexibility and strength to enable rapid placement and firm support for the insulation.

It is another object of the present invention to make provision for a supporting element or stiffener, useable either as a separate item or as part of an insulating sheet, which is rugged and dependable in use, and is easily handled to permit secure placement and connection in a single movement without the use of special tools of fastening elements; and moreover, an element which, once in place, becomes completely rigid and permanently secured as part of the building structure.

It is a further object to make provision for a supporting device which is low in cost, economical to manufacture and easily installed while affording the necessary flexibility for pressing insulation into the desired disposition together with the necessary rigidity to hold the insulation in place against slipping or loosening over extended periods of time.

It is a further object to provide an insulating product which is so constructed and arranged as to provide for the combined insulation and necessary means for retaining the insulation permanently in place, for example, in walls or ceilings of a building structure without additional special securing or fastening elements; and further, to provide an insulating product of the character described which is economical to make, safely transported and handled and which is self-supporting once positioned in place.

The above and other objects, advantages and features of the present invention will become more readily understood and appreciated from a consideration of the following detailed description taken together with the accompanying drawings, in which:

FIGURE 1 is a perspective view of a preferred form of supporting element formed in accordance with the present invention;

FIGURE 2 is a vertical section view through a ceiling structure in a building showing the relative disposition of the insulating material and supporting elements of the present invention upon installation;

FIGURE 3 is a fragmentary view illustrating in more detail the manner of interconnection between the supporting element and a wall or ceiling structure;

FIGURE 4 is a perspective view of an insulation product incorporating supporting elements formed in accordance with the present invention;

FIGURE 5 is a front view of a modified form of supporting element;

FIGURE 6 is a side view of the supporting element shown in FIGURE 5;

FIGURE 7 is a front view of another modified form of supporting element in accordance with the present invention; and FIGURE 8 is a side view of the supporting element shown in FIGURE 7.

Referring in detail to the drawings, there is represented by way of illustrative example in FIGURE 2 a portion of a wall, ceiling structure or frame for a building and the like in which joists 10 are connected in spaced parallel relation to an outer wall structure, such as, brick, wood or stucco. An inner wall, designated at 14, is representative of any conventional interior wall, such as, plaster, wood and the like. In connection relation, the joist and the outer wall 12 form open areas or spaces 15 therebetween and, prior to application of the inner wall 14, it is customary to position insulating material 16 within each space; once inserted, the insulating material is then covered by the wall 14.

In accord with conventional practice, the insulating material may be in the form of sheets or batts dimensioned to conform to, or to be slightly greater than, the width of the space between joists 10. Moreover, preferably the insulating material is provided with some suitable backing, or is encased in an outer wrapping, for example, of the type shown in FIGURE 2 and 4 wherein paper backing strips 17 and 18 are secured together along borders 19. The borders form on opposite sides of the insulating material connecting flaps or strips that are normally used to secure the insulating material within each space 15.

In order to position the insulation material in place and to retain it against sagging or slipping from the space, and especially when installing the insulating material in ceiling areas, a supporting element or stiffener 20 is shown in FIGURE 1 for positioning and retaining the insulating material in place. The supporting element 20 is illustrated as a separate element in FIGURE 1 and is preferably in the form of an elongated thin metal plate or strap 21 terminating at each end in concave extremities 22. The strap is also made to be relatively wide in relation to its thickness and is composed of a strong, resilient material so as to permit limited flexing in a direction perpendicular to the plane or flat surface of the member, for a purpose to be described. Each extremity 22 is preferably of generally concave configuration to provide rigid, spaced apart points 23, although it will be apparent from a consideration of its intended use that the extremities may be pointed or tapered in a number of ways, for example, in the form of teeth or prongs which are capable of firmly engaging or penetrating the wood body of each joist 10. In this connection, the extremities may be generally characterized as being wedge shaped in that their intended purpose is to wedge against the sides of the joist firmly enough to support the entire weight of the insulating material and prevent outward movement thereof. In length, the supporting element is greater than the distance between joists and by laying the supporting element against the inner, facing surface 18 of the insulation material and forcing the insulating material and supporting element inwardly between the joists, the element will undergo bending or distortion so as to contract and to a sufficient extent that is extremities 22 will clear the inner edges of the joist and move inwardly along the sides for a limited distance. Thus, the supporting element 20 will be distorted into somewhat bowed or arcuate configuration with its extremities 22 tending to move outwardly against the joist 10. As a result, the pointed ends 23 will penetrate the sides of the joist 10 as best seen from FIGURE 3 so that it will be apparent that the weight of the insulating material acting against the element 20 will have a tendency to force the ends more deeply into the joist. Due to the concavity of the extremities, outward movement of the support element will be limited in order to securely support and hold the material away from the inner wall portion 14. Thus, the supporting element should be sufficiently strong so as not to buckle under the weight of the insulating material but with enough resiliency to permit bending into position between the joists 10. Moreover, the element being relatively wide will resist sidewise bending and present a broad supporting surface for the insulation; whereas, a circular or wire like element would tend more to buckle or slip laterally under the weight of the insulating material.

In FIGURE 4 the supporting element 20 is illustrated as forming a unitary part of an insulating product 30. In this relation, a series of supporting elements are disposed at longitudinal, spaced intervals along the surface 18 of the insulating product, each supporting element extending transverse to the length of the insulating material and to the length of the joists 10. Again, each supporting element is dimensioned to be of a length greater than the distance between joists 10 with securing means preferably in the form of a pressure-sensitive tape 32 to apply and hold each supporting element 20 against the surface 18 of the insulating material. As illustrated, the tape 32 is proportioned so that when superimposed over a supporting element it will overlap the sides and extremities 22 whereby the side marginal portions 33 of the tape can be adhered to the surface 18, and overlapping ends 34 may be doubled over the extremities 22 into engagement with the borders 19. The tape thus serves to connect each supporting element 20 to the insulating material as well as to completely cover each element 20, including the pointed extremities so as to make the element safe and easy to handle. In applying the insulating material, the pointed extremities when wedged against the surfaces will tend to rupture the tape and project therethrough into firm engagement with the joist in the same manner as described in relation to FIGURE 3. Accordingly, the product is ready for insertion and installation within the wall or ceiling space without resorting to special fastening or securing operations.

To manufacture the supporting element 20 in large quantities, preferably a continuous strip of metal is first cut to the desired width, then severed into individual sections of a selected length. This can be done by a stamping operation whereby the concave ends 22 are formed when the strip is severed into individual lengths. Although the elements are preferably composed of metal, such as a spring steel, many plastics now commercially available can be employed with the requisite strength and resiliency.

In the modified form of FIGURES 5 and 6, a supporting element 35 is illustrated having the necessary flexibility to permit bending or distortion for positioning in place, and coupled with the necessary rigidity when in connected relation so as not to shift or bend. Here, the element is comprised of a pair of bars or rods 36 which are individually preformed and connected together to define straight connected portions 37 interrupted by relatively broad, open portions 38; each extremity includes opposite, spaced-apart pointed end portions 40. Again therefore the element is defined by a relatively wide intermediate portion having extremities in the form of rigid-spaced apart pointed ends for positive engagement with the side surfaces of the joist 10.

In the modified form of FIGURES 7 and 8, the supporting element 45 is defined by longitudinally extending, spaced rods 46 each provided with pointed extremities 47. Here the rods are interconnected by cross members 48 at spaced intervals therealong and in this way to provide the necessary rigidity while permitting the element to be flexed out of its plane and against the insulating material for insertion between the joist. As in the other forms of invention, the element 45 may be cut at desired intervals from continuous length according to the spacing between joists, and may be incorporated as a part of the insulating product in manufacture.

It will be readily seen from the foregoing that there have been devised vastly improved forms of supporting elements which have the necessary flexibility to permit insertion and positioning of the insulation, then upon insertion to be completely rigid so as to avoid accidental shifting or loosening either of the insulating material or the element itself. By spacing a series of supporting elements along the length of the insulating material, coupled with the relatively broad supporting surface of each element the material will have little tendency to sag between the elements, nor will the element sink into the thickness of the material. Also, due to its width, the element is completely rigid to avoid lateral shifting once secured in place and can be easily grasped and handled in operation. Whether used as a separate member or as part of an insulating product, it will be further apparent that the supporting element of the present invention can be used in conjunction with insulation in virtually any form of building enclosure between the building support members, or where some suitable supporting means is provided between which the element may be wedged in order to hold the insulating material in place.

Accordingly, it is to be understood that various changes and modifications in the present invention may be resorted to without departing from the spirit and scope thereof as defined by the appended claim.

What is claimed is:

An insulating product adapted for disposition in a space formed between a pair of supporting members, said product comprising a batt of insulating material dimensioned to fill the space, a plurality of flat, elongated metal plates defining stiffeners extending beyond the end of the batt and being spaced at intervals along the inner face of the batt, each plate having concave extremities at opposite ends thereof, each extremity terminating in a pair of spaced apart, rigid, pointed end portions, said plates each being flexible in a direction to provide for bending into arcuate, wedged relation between the supporting members, and a securing tape covering and overlapping the sides of each plate and covering opposite pointed end portions thereof holding each plate in connected relation against said batt.

References Cited by the Examiner

UNITED STATES PATENTS

| | | | |
|---|---|---|---|
| 2,239,394 | 4/1941 | MacKechnie | 20—4 |
| 2,247,024 | 6/1941 | Hurley | 20—9 |
| 2,278,732 | 4/1942 | Parsons | 20—4 |
| 2,624,080 | 1/1953 | Eichenlaub | 20—9 |

FOREIGN PATENTS 739,993  9/1955  Great Britain.

JACOB L. NACKENOFF, *Examiner.*

FRANK L. ABBOTT, *Primary Examiner.*